(12) United States Patent
Coady et al.

(10) Patent No.: US 8,436,240 B1
(45) Date of Patent: May 7, 2013

(54) QUICK RELEASE COUPLING

(75) Inventors: William Joseph Coady, Port Hawkesbury (CA); Matthew Lawrence Swan, Point Edward (CA)

(73) Assignee: Billdidit Inc., Sydney, Nova Scotia (CA)

( * ) Notice: Subject to any disclaimer, the term of this patent is extended or adjusted under 35 U.S.C. 154(b) by 26 days.

(21) Appl. No.: 13/276,508

(22) Filed: Oct. 19, 2011

(51) Int. Cl.
*G10D 13/02* (2006.01)

(52) U.S. Cl.
USPC .............................................. 84/421; 84/327

(58) Field of Classification Search ............ 84/421, 84/327
See application file for complete search history.

(56) References Cited

U.S. PATENT DOCUMENTS

| | | | | |
|---|---|---|---|---|
| 3,336,827 A * | 8/1967 | Gaylor | | 84/422.3 |
| 4,274,181 A * | 6/1981 | Schaller | | 24/656 |
| 4,319,514 A * | 3/1982 | Donohoe | | 84/421 |
| 4,365,535 A * | 12/1982 | Buttner et al. | | 84/421 |
| 4,960,028 A * | 10/1990 | Ramirez | | 84/421 |
| 5,749,691 A * | 5/1998 | Campbell | | 411/433 |
| 5,775,863 A * | 7/1998 | Anderson | | 411/512 |
| 6,177,621 B1 * | 1/2001 | Hoshino | | 84/422.3 |
| 6,199,872 B1 * | 3/2001 | Hasan | | 279/30 |
| 6,212,917 B1 * | 4/2001 | Rathbun | | 68/212 |
| 6,930,233 B2 * | 8/2005 | Hsieh | | 84/422.3 |
| 7,176,368 B2 * | 2/2007 | Takegawa | | 84/422.3 |
| 7,256,337 B1 * | 8/2007 | Walker | | 84/327 |
| 7,479,593 B1 * | 1/2009 | Townsend | | 84/421 |
| 7,888,572 B2 * | 2/2011 | Rosenberg et al. | | 84/327 |
| 8,288,639 B2 * | 10/2012 | Carraro | | 84/421 |
| 2008/0163738 A1 * | 7/2008 | Rosenberg et al. | | 84/421 |

* cited by examiner

*Primary Examiner* — Robert W Horn
(74) *Attorney, Agent, or Firm* — Marks & Clerk; Richard J. Mitchell

(57) ABSTRACT

A quick release coupling has a first component with an axial portion terminating in a shoulder defining an abutment surface. A second component has a collar with a cavity defining an internal abutment surface and having a lateral opening to permit the collar to be laterally slid onto the axial portion such that the internal abutment surface engages the abutment surface of the shoulder to inhibit axial separation of said first and second components. An axial bolt is displaceable into a position extending between the axial portion and the collar so as to inhibit lateral movement of the collar when the collar is positioned on the axial portion. In order to release the coupling, the bolt is retracted to permit lateral displacement of the collar and thereby release of the coupling.

20 Claims, 3 Drawing Sheets

QUICK RELEASE COUPLING

FIELD OF THE INVENTION

This invention relates to the field of mechanical couplings, and in particular to a quick-release coupling suitable for mounting on a cymbal set, although it also has broader application in other fields.

BACKGROUND OF THE INVENTION

While the invention has application to various fields where a quick-release coupling is desirable, it has particular application to a cymbal release device and will be discussed in this context.

In a conventional cymbal set-up a drummer will be surrounded by several cymbals of different sizes, each mounted on a stand, typically in the form of an upstanding rod. The cymbal is placed between two felts and clamped to the end of the stand. The conventional way of doing this is to tighten a wing nut onto a threaded end of the stand to achieve the desired degree of tightness. This process is fiddly and time-consuming since the wing nut has to be adjusted to the required degree of tightness, and is also prone to loss of components as it is easy to drop the wing nut.

An alternative solution is described in U.S. Pat. No. 7,479,593. In this arrangement a spring-loaded toothed lever engages a thread on the cymbal stand. As this device depends solely on the force of the spring to hold it in position, and the only positive engagement is between the teeth of the lever and the thread on the stand, this device may have a tendency to work loose over time as the spring loses its strength.

SUMMARY OF THE INVENTION

According to the present invention there is provided a quick release coupling comprising a first component having an axial portion terminating in a shoulder defining an abutment surface; a second component having a collar with a cavity defining an internal abutment surface and having a lateral opening to permit said collar to be laterally slid onto said axial portion such that said internal abutment surface engages said abutment surface of said shoulder to inhibit axial separation of said first and second components; and an axial bolt that is displaceable into a position extending between said axial portion and said collar so as to inhibit lateral movement of said collar when said collar is positioned on said axial portion.

The bolt is typically resiliently biased into position, for example with a spring or other resilient means, such as a hydraulic or pneumatic actuator providing a spring bias. The bolt can also be displaced by an actuator, such as a hydraulic or pneumatic actuator, associated with a switch or button to release the hydraulic lock.

In one embodiment the bolt is retracted into the cavity with the aid of a knob axially displaceable on the collar, but it could also be retractable into the axial portion of the first component.

The bolt is typically spring-loaded, but other forms of resilient bias could be used, such as a hydraulic or pneumatic actuator or a compressed elastomer or like material.

The invention has broader application to other fields where a quick-release mechanical coupling is required, but a particular application is as a locking device for the retention of a cymbal on a cymbal stand allowing quick release of the cymbal by the drummer. In this case the first component is attached to the cymbal stand and the cymbal held in place by the second component. The drummer can remove the coupling with just one hand movement. A vertical pull on the knob upwards followed by a lateral movement results in the second component coming free of the first component, thus allowing the cymbal to be removed from the stand.

Thus in another aspect the invention provides a cymbal mounting arrangement comprising a cymbal stand with an upstanding mounting rod; a first component fitted on the distal end of the rod and having an axial portion terminating in a shoulder defining an abutment surface; and a second component for retaining a cymbal on the cymbal stand comprising a collar with a cavity defining an internal abutment surface and having a lateral opening to permit said collar to be laterally slid onto said axial portion such that said internal abutment surface engages said abutment surface of said shoulder to inhibit axial separation of said first and second components; a bolt in said collar that is resilient biased to axially engage said axial portion so as to inhibit lateral movement of said collar when said collar is positioned on said axial portion; and a knob on the collar for withdrawing the spring-loaded bolt from engagement with said axial portion so as to permit lateral displacement of said collar and thereby separation of the first component from the second component to permit removal of a cymbal from the cymbal stand.

BRIEF DESCRIPTION OF THE DRAWINGS

The invention will now be described in more detail, by way of example only, with reference to the accompanying drawings, in which.

DETAILED DESCRIPTION OF EMBODIMENTS OF THE INVENTION

Figure 1:
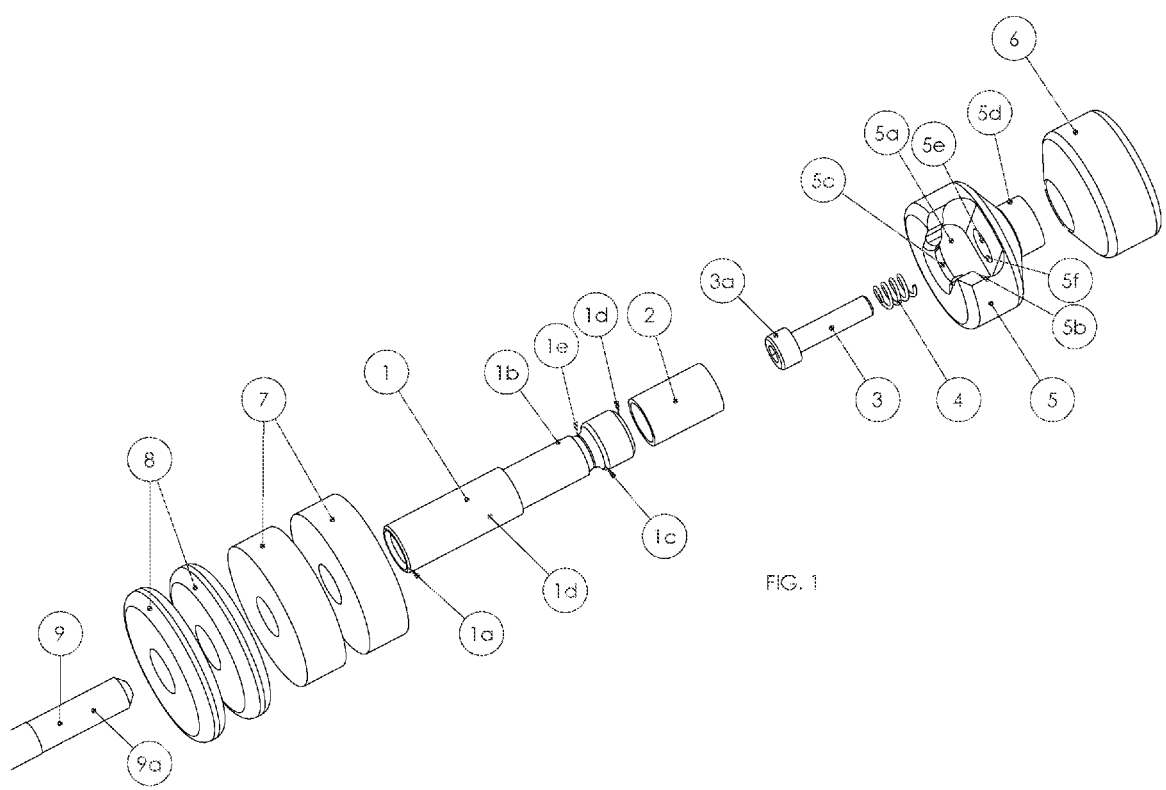
FIG. 1 is a sectional view of the end of a cymbal stand with a quick-release coupling in accordance with an embodiment of the invention.
Figure 2:
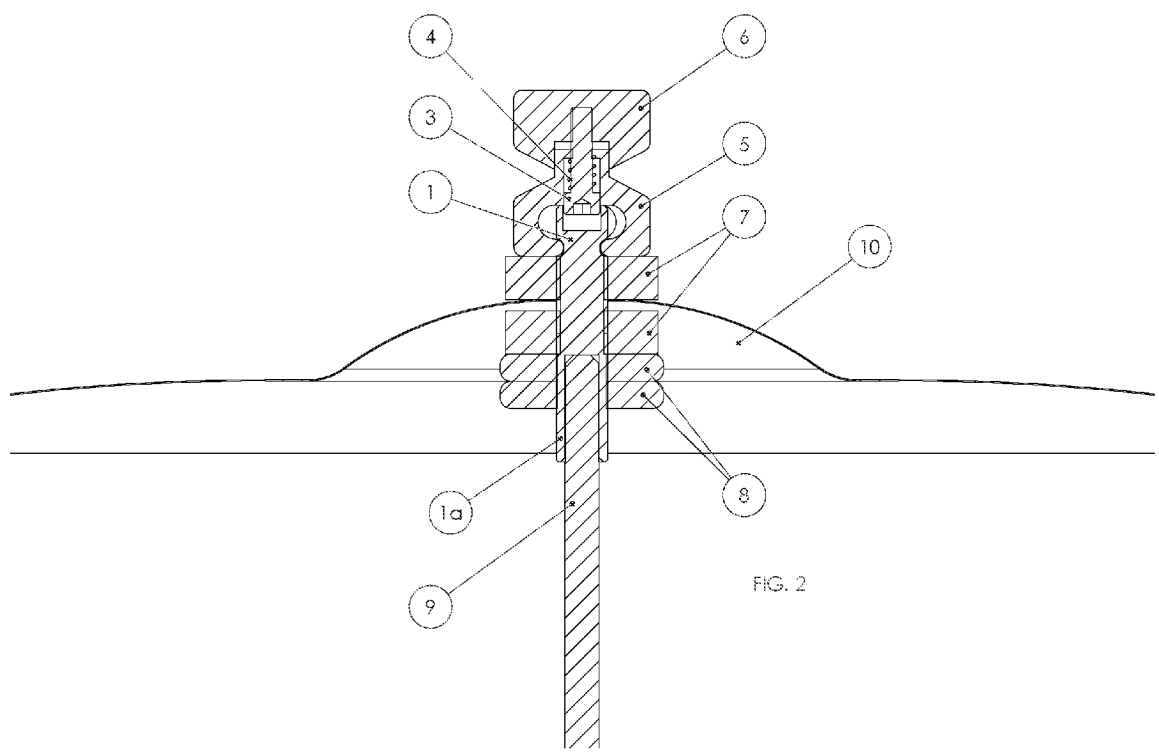
FIG. 2 is an exploded view of the coupling in accordance with an embodiment of the invention.

Referring now to FIGS. 1 and 2, a cymbal stand in the form of an upstanding rod 9 terminates in a threaded end 9a. This end 9a is screwed into a threaded bore 1a in the lower enlarged end 1d of an adapter 1 forming a first component of the quick-release coupling, which in this embodiment serves as a cymbal locking device.

The outside of the enlarged end 1d of the adapter 1 is also threaded to hold two adjustment nuts 8, which form a support for the lower of two felts 7 between which the cymbal 10 is placed. A protective sleeve 2 is placed on a thinned axial upper portion of the adaptor 1b.

The upper portion of the adaptor 1b includes a groove 1e forming a shoulder that defines a downwardly facing abutment surface 1c that engages the second component of the quick-release coupling. A sleeve 2 is fitted over the axial portion 1b between the enlarged end 1d and the groove 1e.

The second component comprises a collar 5 with a cavity 5a defining an internal abutment surface 5b. The cavity has a lateral opening 5c, which permits the collar 5 to be laterally slid onto the adapter 1 so that the internal abutment surface 5b engages the abutment surface 1c of the adapter 1 to inhibit axial displacement of the collar 5 relative to the adapter 1.

The second component also includes bolt 3, which extends through the collar and which is fixedly attached to knob 6 that is axially displaceable on extension 5d of the collar 5. A spring 4 is mounted on the bolt between end stop 3a and a shoulder 5e formed within a bore 5f within the upper part of the collar 5 accommodating the bolt 3. The bolt extends through the extension 5d and is screwed into a threaded bore in the knob 6 as shown in FIG. 2. The spring 4 biases the bolt 3 downwardly so as to protrude into the cavity 5a thus blocking entrance into the cavity. The knob 6 allows the bolt 3 to be withdrawn completely into the bore 5f above the cavity 5a against the bias of the spring 4 simply by pulling up on the knob 6 thus freeing the opening into the cavity.

In order to mount the second component on the adapter, the knob 6 is pulled up against the action of the spring 3 to free the opening into the cavity 5a. With the bolt withdrawn into the cavity 5a, the collar 5 can be slid laterally onto the adapter 1 so that the abutment surface 1c of the adapter engages the internal abutment surface 5b within the cavity 5a. When the knob 6 is released, the spring 4 urges the bolt 3 to protrude from the bore 5f into a recess 1d in the end of the adapter 1 now located in the cavity 5a. The bolt 3 thus locks the collar 5 against lateral movement and thus prevents separation of the two components.

Figure 3:
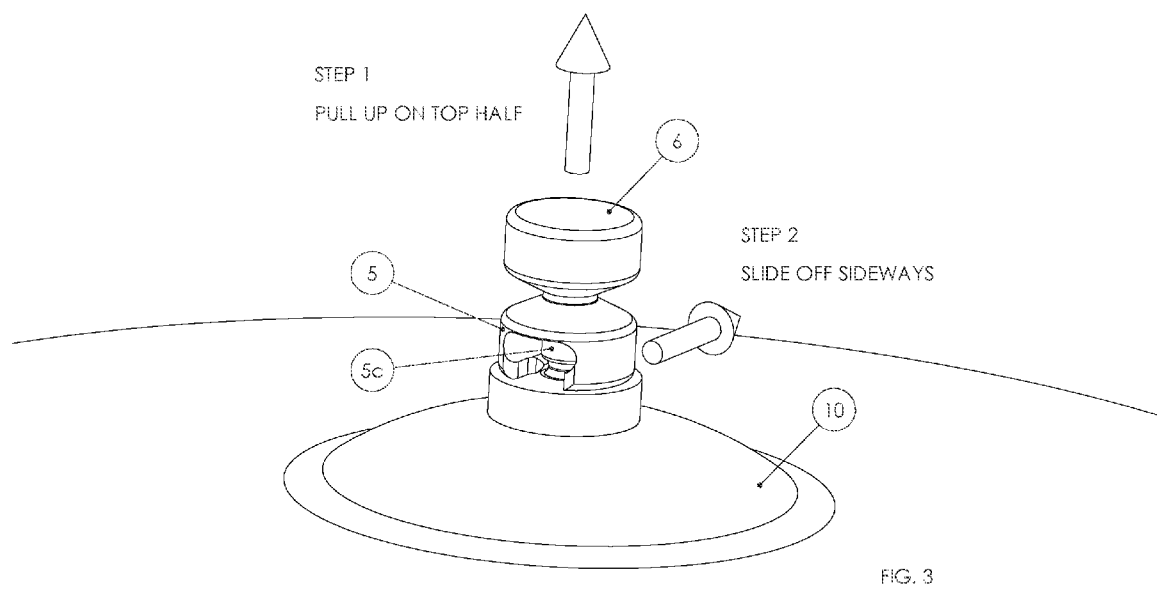
FIG. 3 is a perspective view illustrating the removal of the second component.

In order to separate the components, the bolt 3 is withdrawn into the bore 5f above the cavity 5a of the collar 5 by pulling up on the knob 6 against the bias of the spring 4. This action unlocks the end 1d and permits the collar 5 to be slid laterally off the axial portion 1b of the adapter 1 to thereby separate the two components, as shown in FIG. 3.

To mount a cymbal, the drummer merely has to place the cymbal between the felts in a conventional manner, pull up on the knob 6 as described and slide the collar onto the adapter 1 so that the abutment surfaces engage. Release of the knob prevents separation of the components due to the axial engagement of the bolt 4 with the adapter 1. In this configuration, the components are locked against both axial and lateral displacement.

To remove the cymbal, the drummer merely needs to pull up on the knob, which allows him to slide the collar 5 laterally off the adapter 1. This action can be easily achieved in one hand movement with the hand undergoing an upward motion followed by a sideways motion.

While the currently preferred embodiment has been described, other embodiments are possible. For example, instead of engaging a recess in the end of the adapter 1, the end of the bolt 4 could be hollow and fitted over a protrusion on the end of the adapter 1.

In an alternative embodiment, the spring-loaded bolt could be retractable into a hollowed portion in the end of the adaptor. In this case, the knob could protrude from a slot in the side of the axial portion 1b. This embodiment might require two hands to remove the collar 5.

The bolt 3 does not have to be biased with a spring. Other resilient biasing means, such as a compressed elastomer or like material, could be used. Alternatively, the bolt could be biased with a hydraulic or pneumatic actuator located either in the cavity or the end of the adaptor. This could provide a lock that would be released by a button or a switch.

As noted, although useful particular in the field of cymbal retention, the invention has application in other fields where a quick-release mechanical coupling is desirable. For example, the cymbal could be replaced by a rod with a lateral opening through which the axial portion 1a is passed. The collar could then be used to retain the rod in place and provide a mechanical linkage such that the rod could easily be removed for disassembly. Other uses of the invention include a door/gate latch system, an equipment access panel quick removal system, a roller end holding system, pneumatic and hydraulic quick connects, and an electrical connector. In the latter case, a stronger spring may be required, with a wedge used to release the collar.

The invention claimed is:

1. A quick release locking coupling comprising:
   a first component having an axial portion terminating in a shoulder defining an abutment surface;
   a second component having a collar with a cavity defining an internal abutment surface and having a lateral opening to permit said collar to be laterally slid onto said axial portion such that said internal abutment surface engages said abutment surface of said shoulder to inhibit axial separation of said first and second components; and
   an axial bolt that is displaceable into a position extending between said axial portion and said collar so as to inhibit lateral movement of said collar when said collar is positioned on said axial portion, said bolt being retractable to permit lateral displacement of said collar and thereby release of the coupling.

2. A quick-release coupling as claimed in claim 1, wherein said bolt is resilient biased into said position extending between said axial portion and said collar.

3. A quick-release coupling as claimed in claim 2, wherein the bolt is retractable into a bore in said collar extending from said cavity.

4. A quick-release coupling as claimed in claim 3, wherein said axial portion defines a recess in an end face thereof, and said bolt is biased to axially engage in said recess when said collar is positioned on said axial portion.

5. A quick-release coupling as claimed in claim 4, further comprising a knob for withdrawing the spring-loaded bolt into the bore to permit lateral displacement of said collar and thereby release of the coupling.

6. A quick-release coupling as claimed in claim 5, wherein the knob is axially displaceable on an extension of the collar, and said bolt extends axially through the bore in said collar to said knob.

7. A quick-release coupling as claimed in claim 6, wherein the bolt has an external spring extending between a stop on the bolt and an internal shoulder surface within the bore.

8. A quick-release coupling as claimed in claim 1, wherein the shoulder of said first component is defined by a groove formed in the end of the axial portion of the first component.

9. A quick-release coupling as claimed in claim 1, wherein the bolt is retractable into the axial portion.

10. A quick-release coupling as claimed in claim 1, wherein the bolt is displaced by a hydraulic or pneumatic actuator.

11. A quick-release coupling as claimed in claim 1, wherein the first component is adapted to fit on a cymbal stand, and the second component serves as a retaining clip to releasably hold a cymbal in place on the cymbal stand.

12. A quick-release coupling as claimed in claim 11, wherein the first component comprises a rod with a threaded bore at one end for screwing onto the top of a cymbal stand.

13. A quick-release cymbal coupling comprising:
   a first component adapted to fit on the distal end of a cymbal stand and having an axial portion terminating in a shoulder defining an abutment surface; and
   a second component for retaining a cymbal on the cymbal stand comprising:
   a collar with a cavity defining an internal abutment surface and having a lateral opening to permit said collar to be laterally slid onto said axial portion such that said internal abutment surface engages said abutment surface of said shoulder to inhibit axial separation of said first and second components;

a bolt in said collar that is resilient biased to axially engage said axial portion so as to inhibit lateral movement of said collar when said collar is positioned on said axial portion; and a knob for withdrawing the spring-loaded bolt from engagement with said axial portion to permit lateral displacement of said collar and thereby separation of the first component from the second component to permit removal of a cymbal from the cymbal stand.

14. A quick-release coupling as claimed in claim 13, wherein the rod comprises an external thread for receiving cymbal adjustment nuts.

15. A quick-release coupling as claimed in claim 13, wherein said axial portion defines a recess in an end face thereof, and said bolt is axially biased into engagement with said axial portion in said recess when said collar is positioned on said axial portion.

16. A quick-release coupling as claimed in claim 13, wherein the knob is axially displaceable on an extension of the collar, and said bolt extends axially from said cavity through a bore in the collar to said knob.

17. A quick-release coupling as claimed in claim 16, wherein the bolt has an external spring extending between a stop on the bolt and an internal shoulder surface of the bore in the cavity.

18. A quick-release coupling as claimed in any one of claims 13, wherein the shoulder is defined by a groove formed in the end of the axial portion of the first component.

19. A cymbal mounting arrangement comprising:
a cymbal stand with an upstanding mounting rod;
a first component fitted on the distal end of the rod and having an axial portion terminating in a shoulder defining an abutment surface; and
a second component for retaining a cymbal on the cymbal stand comprising:
a collar with a cavity defining an internal abutment surface and having a lateral opening to permit said collar to be laterally slid onto said axial portion such that said internal abutment surface engages said abutment surface of said shoulder to inhibit axial separation of said first and second components;
a bolt in said collar that is resilient biased to axially engage said axial portion so as to inhibit lateral movement of said collar when said collar is positioned on said axial portion; and
a knob on the collar for withdrawing the spring-loaded bolt from engagement with said axial portion so as to permit lateral displacement of said collar and thereby separation of the first component from the second component to permit removal of a cymbal from the cymbal stand.

20. A cymbal stand as claimed in claim 19, wherein said axial portion defines a recess in an end face thereof, and said bolt is axially biased into engagement with said axial portion in said recess when said collar is positioned on said axial portion.

* * * * *